Feb. 12, 1952   K. E. SICKELBOWER   2,585,279
KNEE PONY
Filed Feb. 12, 1948

INVENTOR.
KENNETH E. SICKELBOWER
BY
Atty

Patented Feb. 12, 1952

2,585,279

UNITED STATES PATENT OFFICE 2,585,279

KNEE PONY

Kenneth E. Sickelbower, Russell, Kans.

Application February 12, 1948, Serial No. 7,921

4 Claims. (Cl. 272—1)

This invention relates to a toy for the entertainment of children and comprises a knee pony cut from a sheet of flexible material and creased and folded into the shape desired to represent the particular animal being made, and while this description will deal particularly with the representation of a horse or pony I wish it understood that the principle of construction may be applied to the making of other animals or the like and for the purpose of offering entertainment and educational facilities for children.

In the bringing up of children it is a well known principle of education to teach the child recognition of common objects through visual means and by actual contact where possible. This is accomplished most readily through the medium of toys made to represent the objects desired to be impressed on the child's mind. In this instance a toy representing a pony that is adapted to rest easily on a parent's knee and on which the child may sit and be teetered will soon bring to the child's mind sense of recognition of the use of a pony to carry one about, and while this invention is only a toy it is also an educational toy and will help materially in teaching a child to recognize ordinary things and objects and their use.

It is therefore, an object of the invention to provide a toy for the entertainment and education of children.

It is also an object of the invention to provide a toy representing a pony, or any other animal or object made from sheet material that is flexible so that it may be cut, creased and folded to represent the object intended.

It is also an object of the invention to provide an educational toy wherein the parent may join the child in the manipulation and handling of the toy for the entertainment and education of the child.

Other objects and advantages will become apparent as the description progresses and the study of the drawings accompanying this specification gives a clear understanding of the invention and its advantages for the purpose intended.

Reference being now had to the drawings, Figure 1 represents a knee pony in perspective as folded from sheet material and in this instance shows how the folded sheet comes together to represent a pony.

Figure 1:
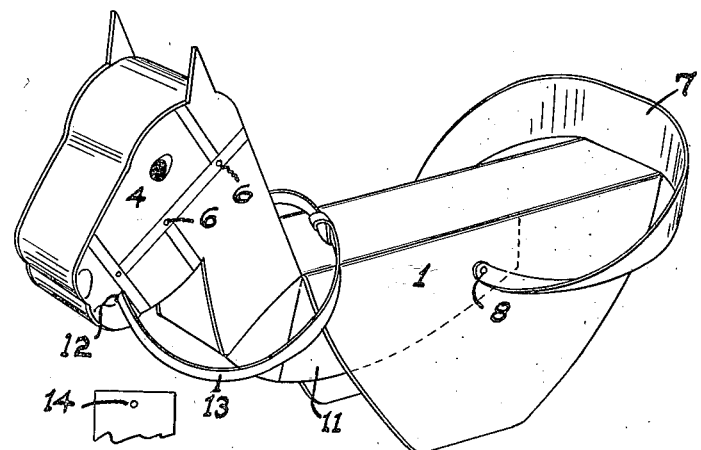

The numeral 1 represents the sheet from which the knee pony is cut. 2 and 3 represent the median lines running through the sheet which form the seat portion, the back of the neck, the central head portion and the portion extending down around the nose and under the neck. 4 represents the two sides of the head portion which form the head of the pony when they are bent as in Figure 1. The flaps 5 are bent inward between the head portions and are secured to the head portions by the fasteners 6 which may be split rivets or like fasteners. 7 represents the back rest member formed integral with the body portion 1. When the sheet is folded into the pony shape the ends of the back rest are bent around and fastened by means of snap fasteners 8, or split rivets. The snap fasteners are preferable as they may be easily detached if the pony is to be unfolded for storing away or for shipment.

Figure 2:
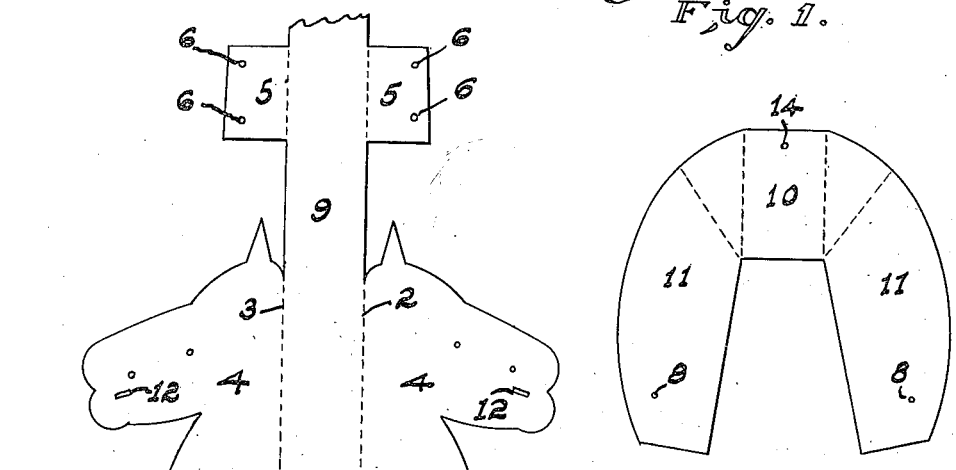
Figure 2 is a sheet of material from which a pony is cut prior to folding to form the pony of Figure 1.
Figure 3:
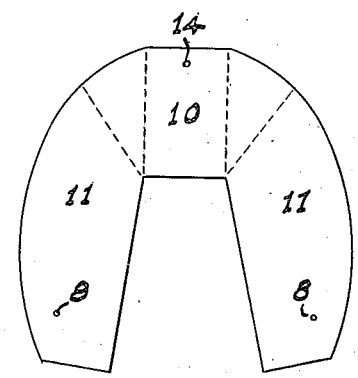
Figure 3 represents an additional supporting portion forming a closure under the pony's neck and folded back under the depending side portions of the sheet of Figure 2.

9 represents a narrow strip forming the rear neck portion extending back to the saddle portion to which it is secured by a suitable rivet or fastening as at 14 of Figs. 1, 2 and 3. In bending the head and body portions into shape the extension strips 5, Fig. 2 are secured to the head portion of the pony by means of suitable fasteners 6—6 as shown in Fig. 1.

10 represents the portion shown in Figure 3 having the side flaps 11 that fold downwardly and extend rearwardly under the side portions 1 of the saddle area and are secured in place as shown in Figure 1 by the fasteners 8.

Slots 12 are provided for retaining the rein 13 in the pony's mouth. The halter shown in Figure 1 may be painted on the sides of the head or short pieces of leather strap or imitation leather may be pasted or otherwise secured to the sides of the head.

Figure 2 shows how the sheet material is cut and creased so that when folded as in Figure 1 a pony is formed, and Figure 3 shows how the supporting member is cut and creased to be placed under the head portion and act as a stiffener to hold the head in normal position relative to the rest of the device. The portion 10 is secured to the end of the central strip 9 by means of a split rivet or the like represented by the numeral 14.

Since the drawings so clearly show the manner of cutting and folding the material from which the knee pony is formed no further description seems necessary.

It is obvious that changes in form, proportion and details of construction may be resorted to without departing from the spirit of my invention and I reserve the right to all changes which come within the scope of this specification and the claims which follow.

Instead of serving only as a knee pony the side flaps 1 and 11 may be spread out substantially flat and the pony placed on the floor when the child may rest on the seat portion with his legs more or less encircling the neck portion of the pony, he may grasp the reins and ride to his heart's content.

Having thus described my invention what I claim as new and desire to secure by Letters Patent is:

1. A knee pony made of flexible material creased and folded into the representation of a pony comprising a section including a pair of side body members, a pair of head and neck members, and a centrally disposed strip member connecting and spacing said side body members and head and neck members and adapted to extend from the rear of said side body members forward to form a seat and on up the back of the neck and over the head and nose and down the front of the neck to hold and support the head and neck members, an auxiliary neck and head supporting member secured to the sides of the said side body members and attached to the under portion of the neck adjacent the side body members to hold and support the head and neck in normal positions.

2. A knee pony made of flexible material creased and folded into the representation of a pony comprising a section including a pair of side body members, a pair of head and neck members, and a centrally disposed strip member connecting and spacing said side body members and head and neck members and adapted to extend from the rear of said body members forward to form a seat and on up the back of the neck and over the head and nose and down the front of the neck to hold and support the head and neck members, an auxiliary neck and head supporting member secured to the said side body members and attached to the under portion of the neck adjacent the side body members to hold and support the head and neck members in normal positions, and a back rest integral with said side body members and said centrally disposed strip member.

3. A knee pony made of flexible material creased and folded into the representation of a pony comprising a section including a pair of side body members, a pair of head and neck members, and a centrally disposed strip member connecting and spacing said side body members and head and neck members and adapted to extend from the rear of the said body members forward to form a seat and up on the back of the neck and over the head and nose and down the front of the neck and secured thereto to support and hold the head and neck members, an auxiliary neck and head supporting member secured to the insides of the said side body members and attached to the under portion of the neck adjacent the side body members to hold and support the head and neck in normal positions, and a back rest secured to said centrally disposed member and cut away from said side body members so as to fold around over said side body members and be secured thereto.

4. A knee pony made of foldable material creased and folded into the representation of a pony comprising a section including a pair of side body members and a pair of head and neck members, and a centrally disposed strip member connecting and spacing said side body members and said head and neck members and adapted to extend from the rear of the said body members forward to form a seat and on up the back of the neck and over the head and nose and down the front of the neck and secured thereto to hold and support these members, an auxiliary neck and head supporting member secured to the insides of the said side body members and attached to the under portion of the neck adjacent the side body members to hold and support the head and neck in normal positions, a halter imprinted on the sides of the head portions and a rein secured adjacent to the mouth and extending around the neck for the child to grasp.

KENNETH E. SICKELBOWER.

REFERENCES CITED

The following references are of record in the file of this patent:

UNITED STATES PATENTS

| Number | Name | Date |
|---|---|---|
| 1,180,591 | Lee | Apr. 25, 1916 |
| 1,438,083 | Baker | Dec. 5, 1922 |
| 2,252,971 | Goldstein | Aug. 19, 1941 |

FOREIGN PATENTS

| Number | Country | Date |
|---|---|---|
| 207,340 | Great Britain | Nov. 29, 1923 |